(12) United States Patent
Price et al.

(10) Patent No.: US 10,521,650 B2
(45) Date of Patent: *Dec. 31, 2019

(54) 3D IMAGING RECOGNITION BY STEREO MATCHING OF RGB AND INFRARED IMAGES

(71) Applicant: Microsoft Technology Licensing, LLC, Redmond, WA (US)

(72) Inventors: Raymond Kirk Price, Redmond, WA (US); Michael Bleyer, Seattle, WA (US); Jian Zhao, Kenmore, WA (US); Ravi Kiran Nalla, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,345

(22) Filed: Jul. 12, 2019

(65) Prior Publication Data

US 2019/0332853 A1    Oct. 31, 2019

Related U.S. Application Data

(62) Division of application No. 15/403,662, filed on Jan. 11, 2017, now Pat. No. 10,372,974.

(51) Int. Cl.
*G06K 9/00* (2006.01)
*H04N 13/254* (2018.01)
(Continued)

(52) U.S. Cl.
CPC ..... *G06K 9/00288* (2013.01); *G06K 9/00201* (2013.01); *G06K 9/00281* (2013.01); *G06K 9/00899* (2013.01); *G06K 9/4652* (2013.01); *G06K 9/4661* (2013.01); *H04N 5/2258* (2013.01); *H04N 5/3572* (2013.01); *H04N 9/045* (2013.01); *H04N 13/239* (2018.05); *H04N 13/25* (2018.05); *H04N 13/254* (2018.05); *H04N 13/257* (2018.05);
(Continued)

(58) Field of Classification Search
None
See application file for complete search history.

(56) References Cited

U.S. PATENT DOCUMENTS

2011/0221599 A1* 9/2011 Hogasten .......... H01L 27/14609
340/632
2013/0284807 A1* 10/2013 Fullerton ................. G06K 5/00
235/440

(Continued)

*Primary Examiner* — Kevin Ky
(74) *Attorney, Agent, or Firm* — Ray Quinney & Nebeker P.C.; John O. Carpenter (57) ABSTRACT

A three-dimensional (3D) image recognition system includes a first imaging sensor capable of collecting a first wavelength range of light and a second imaging sensor capable of collecting a second wavelength range of light. The first imaging sensor and the second imaging sensor are placed apart. The 3D image recognition system also includes a processor configured to identify at least one landmark area of a first image of an object collected by the first imaging sensor, and identify at least one matching landmark area in a second image of the object collected by the second imaging sensor. The processor is further configured to extract the 3D information of the object from the at least one landmark area of the images collected.

20 Claims, 5 Drawing Sheets

(51) Int. Cl.
*H04N 13/257* (2018.01)
*G06K 9/46* (2006.01)
*H04N 13/25* (2018.01)
*H04N 13/239* (2018.01)
*H04N 13/271* (2018.01)
*H04N 9/04* (2006.01)
*H04N 5/357* (2011.01)
*H04N 5/225* (2006.01)
*H04N 13/00* (2018.01)

(52) U.S. Cl.
CPC ..... *H04N 13/271* (2018.05); *G06K 2209/401* (2013.01); *H04N 2013/0081* (2013.01)

(56) References Cited

U.S. PATENT DOCUMENTS

| | | | | |
|---|---|---|---|---|
| 2015/0256813 A1* | 9/2015 | Dal Mutto | ........... | H04N 13/254 348/47 |
| 2017/0017831 A1* | 1/2017 | Rollend | ............. | G06K 9/00228 |
| 2017/0346817 A1* | 11/2017 | Gordon | .............. | G02B 27/0172 |
| 2018/0075291 A1* | 3/2018 | Tian | ................... | G06K 9/00268 |

* cited by examiner

3D IMAGING RECOGNITION BY STEREO MATCHING OF RGB AND INFRARED IMAGES

CROSS-REFERENCE TO RELATED APPLICATIONS

This application is a divisional of U.S. patent application Ser. No. 15/403,662, filed Jan. 11, 2017, which is hereby incorporated by reference in its entirety.

BACKGROUND

Background and Relevant Art

Three-dimensional (3D) image recognition is commonly achieved by 3D reconstruction or extrapolation from one or more two-dimensional (2D) images. 3D image recognition systems commonly use an imaging sensor, such as a camera, collecting visual information of an object. The system then reconstructs the 3D information from the 2D image (the picture taken by the camera) based on the pixel colors. These kinds of systems, even with high-definition imaging capability, can fail in situations when a photo of the identifying person is placed in front of the imaging sensor, because these systems cannot tell the true depth dimension of the object.

3D stereo cameras can be used to produce 3D images. Stereo cameras include one or more imaging sensors displaced from one another. This allows the cameras capture 3D images, in a process known as stereo photography, similar to human binocular vision. Traditional stereo cameras include at least two identical RGB cameras, which would cost at least twice as much as a regular camera with the similar definition.

There are other higher cost three-dimensional (3D) imaging systems, in which the depth information is collected using a time-of-flight imaging system or a structured light imaging system that utilizes infrared light to calculate distances. Both time-of-flight imaging systems and structured light imaging systems generally require an artificial light source. Having a light source makes the system more energy consuming and costly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a system of a three-dimensional image recognition system is configured with two imaging sensors placed apart, each of which is capable of detecting a different wavelength range of light from an object. A first imaging sensor is configured for biometric identification in a first wavelength range. A second imaging sensor is configured for biometric identification in a second wavelength range. The two imaging sensors collect one or more images of an object at substantially the same time. The system also includes a processor that applies stereo matching algorithms to the collected images and extracts the 3D information from the images.

In other embodiments, the system further includes a storage device in data communication with the processor. The storage device stores authentication data of a pre-determined item, for instance, a user's facial information.

In yet other embodiments, the authentication data may only include 2D characteristics, such as a user's photo (2D image). The processor may verify the 2D image collected to the user's photo. The processor also verifies whether the extracted 3D information shows that the identified features meet the profile of the identified user.

In further embodiments, after accessing the 2D photo of a user, the processor may reconstruct the 3D information of the user's face based on the 2D photo's pixel colors. In some other embodiments, the authentication data includes both 2D information and 3D information of an object.

When the authentication data includes 3D information or the system can reconstruct 3D information from the authentication data, the processor compares the depth information extracted from the images collected to the 3D information obtained or reconstructed from the authentication data, in addition to comparing the images collected to the image stored in the storage device.

In some embodiments, to achieve a faster identification and verification process, the processor identifies one or more landmark areas of the object by applying stereo vision algorithms to an image collected from one imaging sensor; applies stereo matching algorithm to find the matching area in an image collected from the other imaging sensor; and extracts the 3D information only in the landmark area(s).

In other embodiments, one imaging sensor detects ambient light in the visible wavelength range; the other imaging sensor detects ambient light in the infrared wavelength range. In one embodiment both cameras operate in both the IR and Visible Light range. In another embodiment one camera operates in RGB+IR range and another camera operates in IR. In another embodiment one camera operates in RGB+IR and the other camera operates in RGB range only.

In yet other embodiments, at least one of the imaging sensors includes a distortion lens with a predetermined set of distortion parameters. The processor extracts the 3D information from the distorted images, then, reconstructs the 3D information of the object based on the predetermined set of distortion parameters.

Disclosed embodiments also include methods for performing three-dimensional image recognition with the disclosed systems. These methods include collecting a first image of an object from a first position, wherein the first image was generated from a reflection of a first wavelength range of light; collecting a second image of the object from a second position, wherein the second image was generated from a second wavelength range of light. These methods also include reconstructing the 3D information of the object from the first and second images collected; accessing authentication data of a pre-determined item, and comparing the 2D and/or 3D information collected from the images to the authentication data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for three-dimensional (3D) imaging recognition and biometric authentication. More particularly, the present disclosure relates to a 3D imaging recognition system (optionally for biometric authentication) using substantially simultaneous collection of two wavelength image data by two imaging sensors placed apart. The present disclosure relates to filtering and/or collecting a reflected light from ambient light or artificial light source. The present disclosure also relates to applying stereo matching algorithms to the images collected from the two placed-apart imaging sensors to extract 3D information from the images.

In some disclosed embodiments, a system of a 3D image recognition system is configured with two imaging sensors placed apart, each of which is capable of detecting a different wavelength range of light from an object. For example, one imaging sensor may be capable of detecting visible light; the other imaging sensor may be capable of detecting infrared light. The two imaging sensors collect one or more images of a 3D object at substantially the same time. The system also includes a processor that applies stereo matching algorithms to the collected images and extracts the 3D information from the images.

At least one of the imaging sensors includes, in some embodiments, a bandpass filter to attenuate light outside of the visible wavelength range and pass light in the infrared range at and/or near the peak wavelength of the emitted infrared light.

In some embodiments, to reduce costs, one of the imaging sensors has lower definition than the other imaging sensor. The system could allow the lower definition image to be upsampled to correspond to the resolution of the higher definition image data. The upsampling process may use information on other color channels as cues, such as utilizing edge identification or shadow contrast from other channels. Additionally, the system could also allow the higher definition image to downgrade to correspond to the resolution of the lower definition image data.

In a particular embodiment, one imaging sensor is capable of detecting visible light and can be a 1080p imaging sensor, providing visible image data that is approximately 1920×1080 pixels. The other imaging sensor is an infrared imaging sensor with a lower resolution compared to the visible light imaging sensor. The infrared wavelength photoreceptors may provide infrared image data that is approximately 960×540 pixels. In at least one embodiment, a first imaging sensor is a 1024×720 pixel imaging sensor capable of detecting visible light and a second imaging sensor is a 640×480 pixel imaging sensor capable of detecting infrared light. In yet other embodiments, the first imaging sensor and the second imaging sensor may be integrally formed in a hybrid imaging sensor including domains of photoreceptors capable of detecting visible light (e.g., a red wavelength photoreceptor, a green wavelength photoreceptor, and a blue wavelength photoreceptor) and at least one photo receptor capable of detecting infrared light.

Figure 1:
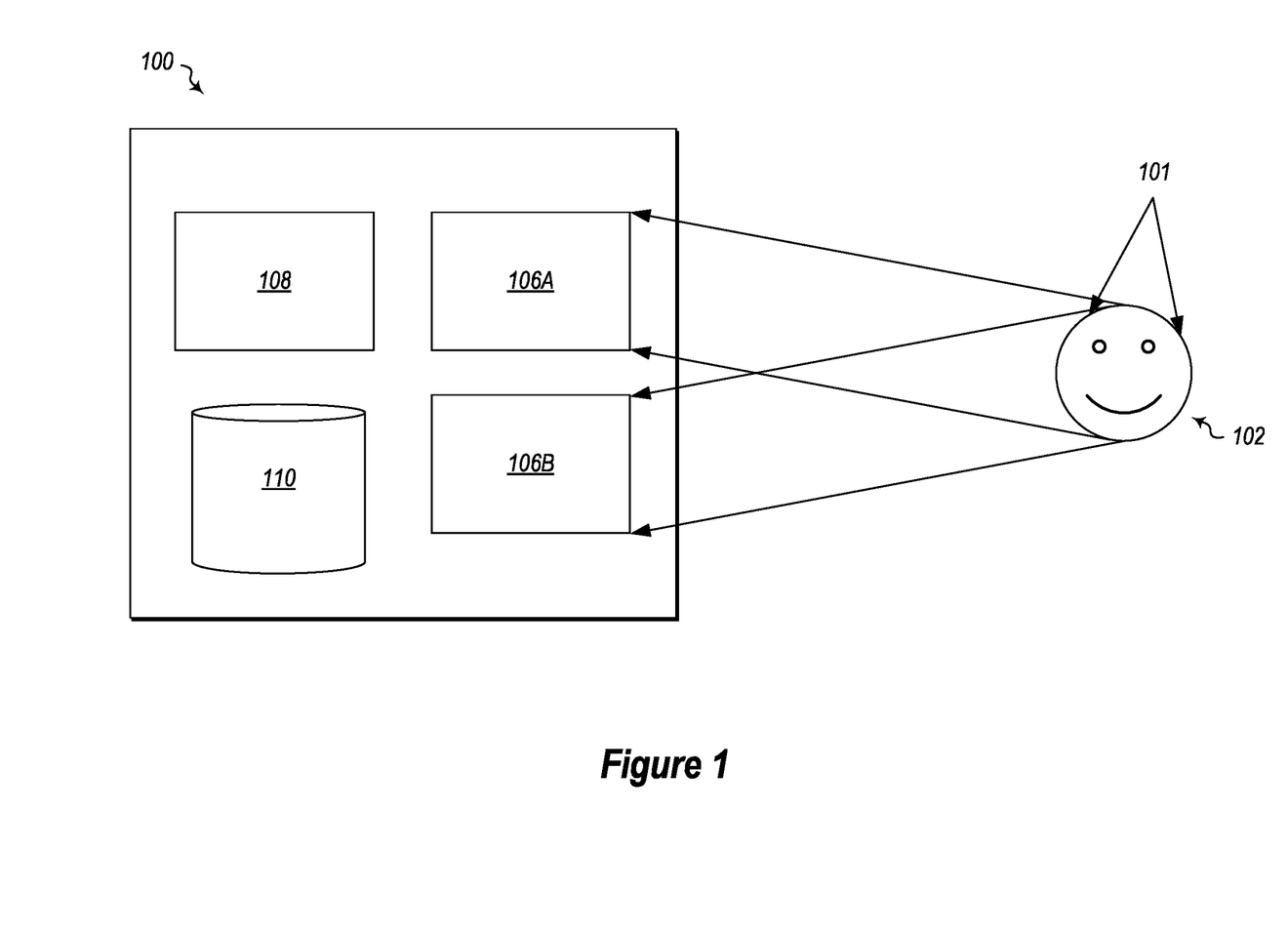
FIG. 1 is a schematic representation of a 3D image recognition system with two imaging sensors placed apart, imaging, and recognizing an object, according to the present disclosure.

FIG. 1 illustrates a schematic representation of a 3D image recognition system 100 imaging an object 102. The 3D image recognition system 100 includes two imaging sensors 106-A, 106-B, which are placed apart. The light source 101 may be an ambient light or artificial light source(s). As described herein, at least one of the imaging sensors 106-A, 106-B collects visual information in the infrared (IR) spectrum and at least one of the imaging sensors 106-A, 106-B collects visual information in the visible light spectrum (for example, in red-green-blue channels or yellow-cyan-magenta channels).

The imaging sensors 106-A, 106-B are in data communication with one or more hardware processors 108 configured to control and/or coordinate data flow and operation of the imaging sensors 106-A, 106-B, and to process the data. The processor 108 processes the images collected by the imaging sensors 106-A, 106-B, applying stereo matching algorithms, to extract the 3D information from the images collected from the reflection of the object 102. In some embodiments, the one or more processors 108 may be a single processor that receives and sends information and commands to both the imaging sensors 106-A, 106-B as shown in FIG. 1. In other embodiments, one or more processors 108 may be a plurality of processors, such as individual processors or controllers configured to control and/or coordinate one of the imaging sensors 106-A, 106-B.

The processor 108 processes the images of an object collected by the imaging sensors 106-A, 106-B and extracts the 3D information of the object by using stereo matching algorithms. The maximum level of security can be achieved by stereo matching the whole images. However, matching the whole images could be hardware consuming and processing time consuming. As a compromise, the system could choose to verify certain areas; or simply choose to detect whether the object is flat, cylindrical or in any shape that is not possible to be the item being verified.

Additionally, the system could further include a storage device 110, integrally attached to the processor. The storage device stores authentication data of a pre-determined item, for instance, a user's facial information. In some circumstances, the authentication data may only include 2D characteristics of a pre-determined item. For example, the authentication data may be user information, including the user's photo (2D image). The processor may verify the 2D image collected to the user's photo. The processor also verifies that whether the extracted 3D information shows that the object is flat, cylindrical or in any shape that is not possible to be a person's face. So long as the 3D information does show that the object is flat or one of the shapes that is not possible to be a person's face, it passes the 3D verification.

In some other embodiments, after accessing the 2D photo of a user, the processor may reconstruct the 3D information of the user's face based on the 2D photo's pixel colors. In some other embodiments, the authentication data includes both 2D information and 3D information of an object.

When the authentication data includes 3D information or the system can reconstruct 3D information from the authentication data, the processor compares the depth information extracted from the images collected to the 3D information obtained or reconstructed from the authentication data, in addition to comparing the images collected to the image stored in the storage device 110.

In some embodiments, to achieve a faster identification and verification process, and due to dissimilarities between RGB and IR images, the processor does not have to match the whole images, instead only identifies one or more landmark areas of the object from one image collected from one imaging sensor; and applies stereo matching algorithms to find the matching area in an image collected from the other imaging sensor. Identifying one or more landmark areas from the first image can be achieved by using different 3D reconstruction algorithms. The landmark areas are normally high contrast areas, such as nose, mouth, chin, and eyes areas of a face. Of course, the more landmark areas are identified, the more reliable the recognition system would be. In some embodiments, the system may allow a pre-determined number of failed matchings, so long as a sufficient number of matching areas are successfully found. To achieve a reasonable reliability, a minimum number of matching areas to be identified is about five.

Figure 2:
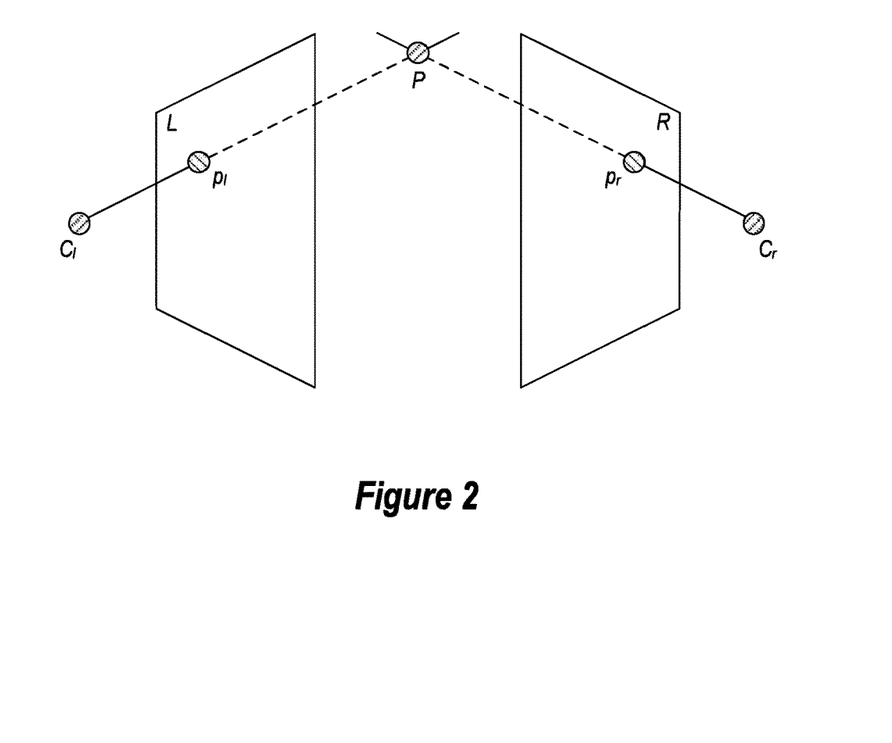
FIG. 2 is a schematic representation of a stereo environment with two imaging sensors placed apart and detecting a point P, according to the present disclosure.
Figure 3:
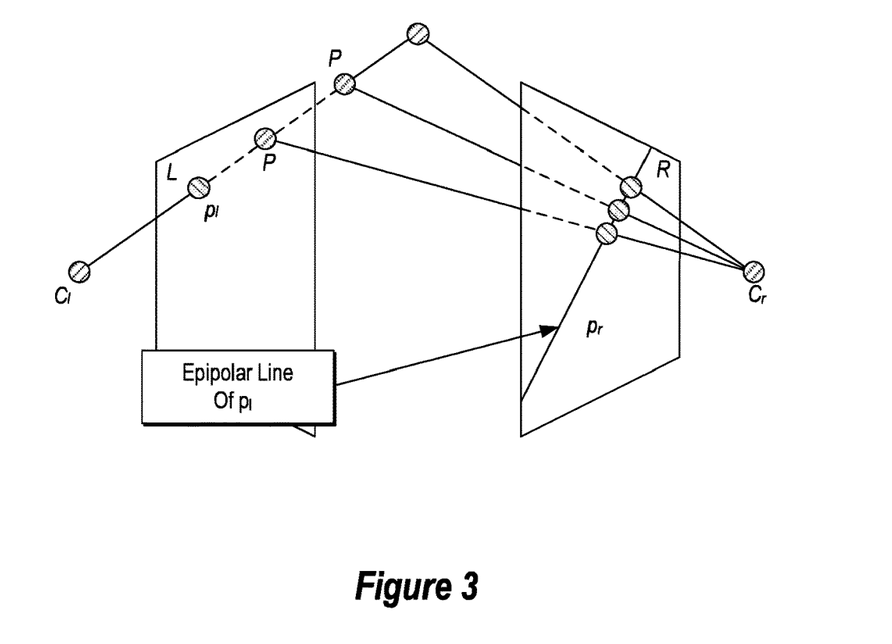
FIG. 3 is a schematic representation of a stereo camera using epipolar geometry to narrow a matching point in a 2D image to a line, according to the present disclosure.

There are several stereo matching algorithms for finding matching areas. FIG. 2 and FIG. 3 illustrate an embodiment of a method that simplifies the matching search from a 2D search of the whole image to a 1D search of a line.

In some embodiments, one imaging sensor detects ambient light in the visible wavelength range; the other imaging sensor detects ambient light in the IR wavelength range. In an embodiment with an artificial light source, at least one of the imaging sensors detects a portion of an emitted light as a reflected light.

FIG. 2 illustrates a stereo environment with two imaging sensors placed apart and detecting a still point P. $C_l$ and $C_r$ are two imaging sensors placed apart, observing the same scene from different perspectives. P is the still point, detected by both imaging sensors $C_l$ and $C_r$ simultaneously. $C_l$ detects and collects an image L, on which the point P is projected at point $P_l$. $C_r$ detects and collects an image R, on which the point P is projected at point $P_r$.

FIG. 3 illustrates a method using epipolar geometry for finding the matching point pairs $P_l$ and $P_r$ that represent the point P of the scene. Upon identifying $P_l$ on image L, which is collected by imaging censor $C_l$, the matching point $P_r$ can be identified on the image R, which is collected by imaging censor $C_r$. P is on the line of $C_l$-$P_l$. Based on the known relative position of $C_l$ and $P_l$, the epipolar line $P_l$ on image R can be reconstructed. The matching point $P_r$ is on the epipolar line $P_l$. The imaging system can then iteratively search along the identified epipolar line for a point $P_r$ on image R that visually matches point $P_l$ on Image L.

Figure 4A:
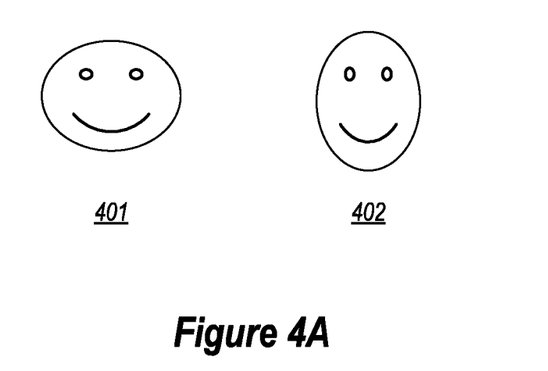
FIG. 4A is a schematic representation of mapping a distortion map to collected images to compensate for known distortion according to a predetermined set of distortion parameters, according to the present disclosure.

FIG. 4A illustrates that, in some embodiments, at least one of the imaging sensors collects an image that is geometrically distorted relative to the other imaging sensor. The distortion may be compensated with a predetermined set of distortion parameters. For example, an imaging recognition system has an infrared imaging sensor and a RGB sensor. An IR image 401 is collected from the infrared imaging sensor, and a RGB image 402 is collected from a RGB imaging sensor. In some embodiments, the both the IR image 401 and the RGB image 402 are distorted. In other embodiments, only one of the IR image 401 and the RGB image 402 is distorted.

In some embodiments, the geometric distortion differences between the imaging sensors, similarly to the differences in resolution or field of view, described herein, may be known differences. A distortion correction map may be applied to one or both of the IR image 401 and the RGB image 402 to correlate pixel coordinates between the two images 401, 402.

Figure 4B:
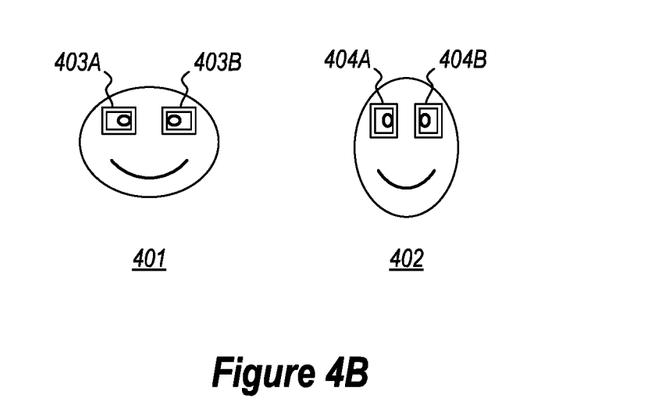
FIG. 4B is a schematic representation of matching identified landmark areas on the collected images of FIG. 4A, according to the present disclosure.

FIG. 4B illustrates the IR image 401 and RGB image 402 of FIG. 4A with landmark areas identified in each image. For example, the IR image 401 includes IR landmark areas 403-A and 403-B on IR image 401; then finds the matching RGB landmark areas 404-A and 404-B of the RBG image 402. In some embodiments, the processor extracts the depth information from the correlated landmark areas, i.e., first IR landmark area 403-A and first RGB landmark area 404-A, and second IR landmark area 403-B and second RGB landmark area 404-B. For example, the depth information may calculated by triangulating the depth of each landmark area as described in relation to FIG. 2 and FIG. 3.

The landmark areas 403-A, 403-B, 404-A, 404-B may have a variety of pixel sizes. In some embodiments, the landmark areas 403-A, 403-B, 404-A, 404-B may have areas of 12 pixels by 12 pixels, 19 pixels by 19 pixels, 25 pixels by 25 pixels, any values therebetween, or combinations thereof. For example, the landmark areas 403-A, 403-B, 404-A, 404-B may have areas of 12 pixels by 25 pixels. In other examples, the landmark areas 403-A, 403-B, 404-A, 404-B may have areas of 19 pixels by 12 pixels. In yet other examples, the landmark areas 403-A, 403-B, 404-A, 404-B may have areas of 15 pixels by 15 pixels.

FIG. 4B illustrates the matching of a first landmark area 403-A, 403-B between the IR image 401 and the RGB image 402 and the matching of a second landmark area 404-A, 404-B between the IR image 401 and the RGB image 402. In other embodiments, the system may match a maximum of 5, 6, 7, 8, 9, 10, 11, 12, 13, 14, 15, or more landmark areas between the IR image 401 and the RGB image 402 to create a sparse depth map of the collected images. In some embodiments, each of the landmark areas has an associated depth value calculated. In other embodiments, at least one of the landmark areas may have no depth value calculated.

Figure 5:
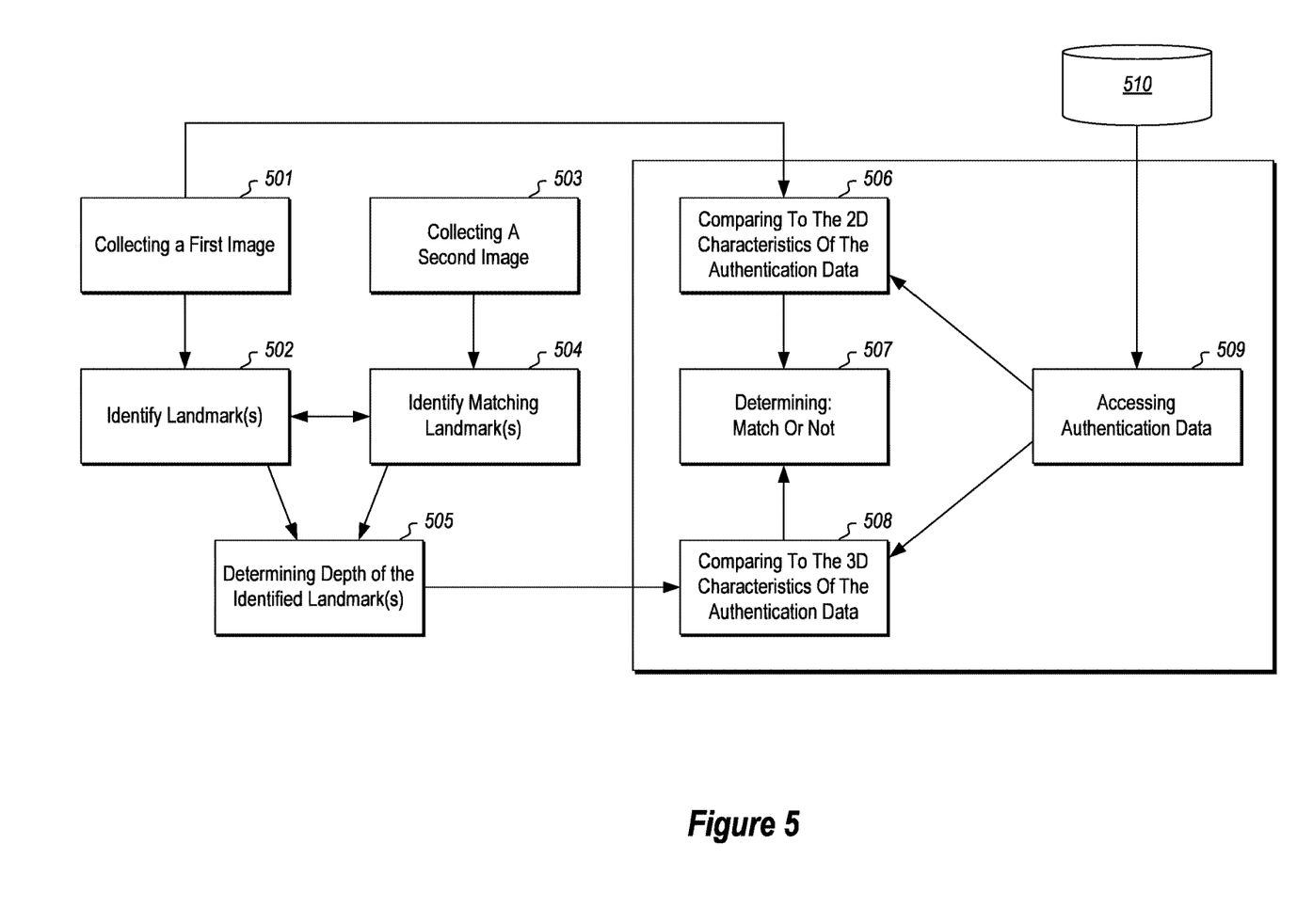
FIG. 5 is a flow chart of a method for 3D image recognition by collecting two images from different positions, according to the present disclosure.

FIG. 5 illustrates a flow chart of a method for 3D image recognition. The method includes an act 501 of collecting a first image from a first position, wherein the first image is a reflection of a first wavelength range of light from an object; and an act 503 of collecting a second image from a second position displaced from the first position, wherein the second image is a reflection of a second wavelength range of light from the object. The first image and the second image may be collected from two separate imaging sensors capable of detecting different wavelength ranges of lights. In at least one embodiment, the first image is collected by an infrared imaging sensor; and the second image is collected by an RGB imaging sensor. Alternatively, the two imaging sensors may have different filters filtering through different wavelength ranges of lights.

In another embodiment, the two images may be collected by the same imaging sensor placed at different positions and applying different wavelength range filters.

The method also includes an act 502 of identifying one or more landmark areas in the first image, and an act 504 of identifying one or more matching landmark areas in the second image. The act 502 of identifying landmark areas can be achieved by using different 3D reconstruction algorithms. The act 504 of identifying matching landmark areas in the second image can be achieved by using stereo vision algorithms, including epipolar geometry. Following the act 504 of identifying the matching areas, an act 505 of determining the depth information of each landmark areas.

The method also includes an act 509 of accessing authentication data from a data source 510. The authentication data includes 2D information and 3D information of a predetermined object. For example, the object could be a user's face; the 2D information could be a photo of the user; the 3D information could be the structure of the user's face, or the depth information of particular features of the user's face, such as the user's nose, forehead, eyes, chin, mouth, ears, or other facial regions.

The method further includes an act of comparing the 2D and 3D imaging data collected and/or processed to the authentication data. The act 506 of comparing to the 2D characteristics of the authentication could include an act of comparing the first image (2D image) collected in act 502 to the 2D characteristics of the authentication data 509, and/or an act of comparing the second image (2D image) collected in act 504 to the 2D characteristics of the authentication data 509. The act 508 of comparing the 3D characteristics of the authentication data includes an act of comparing the depth information determined in act 505 to 3D characteristics of the authentication data 509.

In other embodiments, the authentication data may include only 2D information about the user, and the 3D information of the collected images may be compared against a set of anticipated geometries of a user's biometric profile. For example, the user's profile may include depth information for landmark areas of the face. The 3D information of the collected images may be compared to the user profile information, allow the imaging system to differentiate between similar users or a flat image of the user. In other examples, the 3D information of the collected images may be compared to anticipated unauthorized geometries. For example, anticipated unauthorized geometries may include a cylindrical geometry, trapezoidal geometry, a spherical or ellipsoid geometry, a triangular geometry, or other geometries of a folded photograph.

Finally, the method includes an act 507 of determining whether the 3D and/or 2D information of the object matches the authentication data and returning a value confirming authentication if a match is identified and the depth information either matches the authentication data and/or does not match an anticipated geometric shape, as described herein.

Figure 6:
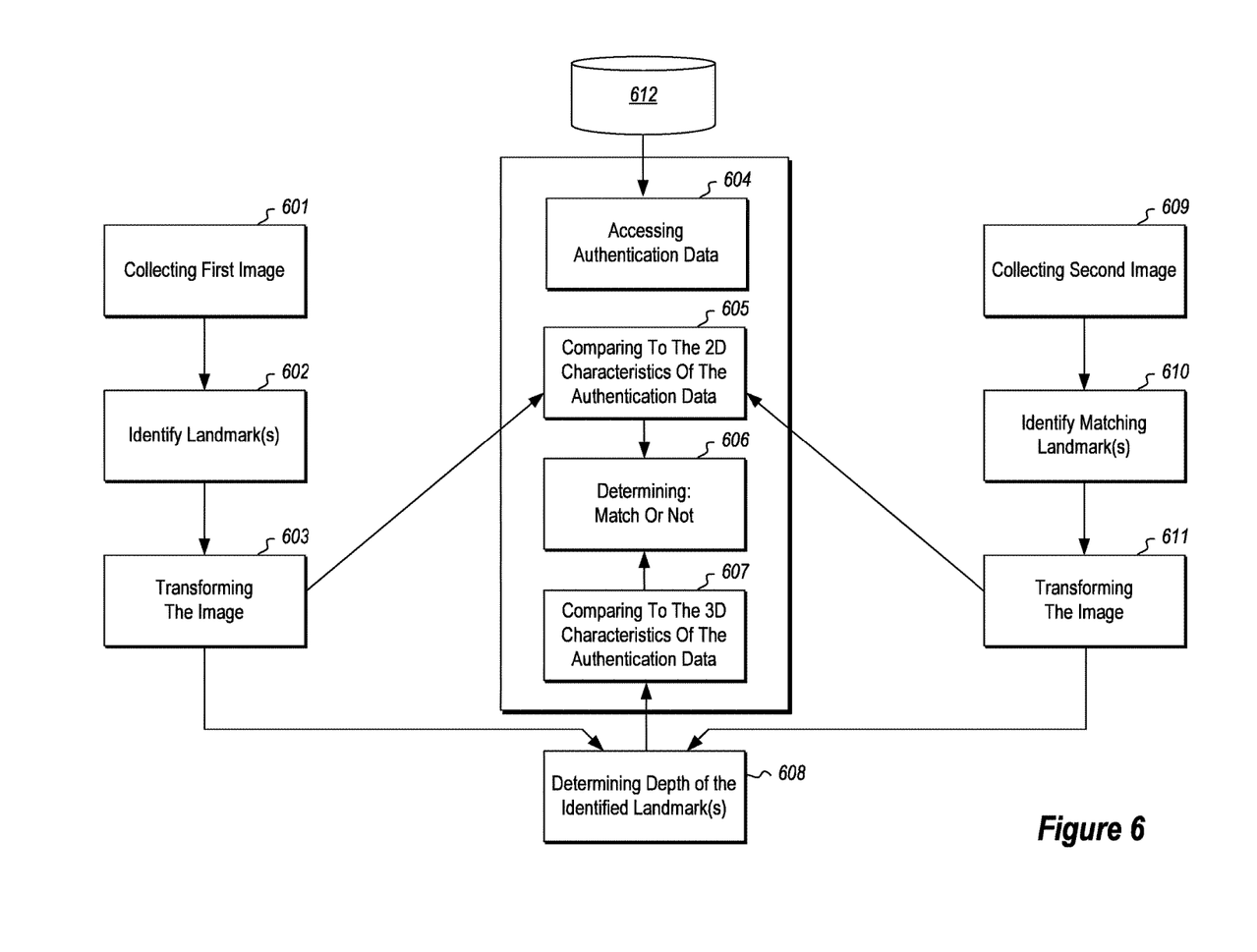
FIG. 6 is a flow chart of a method for 3D image recognition including transforming the image data collected from the image sensor(s), according to the present disclosure.

FIG. 6 illustrates a flow chart of a method for 3D image recognition including transforming the image data collected from the image sensor(s). Similar to the method described in FIG. 5, here, the method includes an act 601 of collecting a first image from a first position, wherein the first image is a reflection of a first wavelength range of light from an object; and an act 609 of collecting a second image from a second position, wherein the second image is a reflection of a second wavelength range of light from the object. Here, at least one of the images collected is distorted. In one embodiment, the distortion is compensated for by using distortion map with predetermined distortion parameters.

The method also includes an act 602 of identifying one or more landmark areas in the first image, and an act 610 of identifying one or more matching landmark areas in the second image. Since at least one of the images collected is distorted, the method further includes acts 603 and/or 611 of transforming the image back to reflect the dimension of the object. After the acts 603 and/or 611, the method further includes an act 608 of determining the depth of the identified landmarks; an act 604 of accessing authentication data from a data source 612; an act 605 and 607 of comparing the 3D and/or 2D information to the authentication data, respectively; and an act 606 of determining whether the 3D and/or 2D information of the object matches the authentication data and returning a value confirming authentication if a match is identified and the depth information either matches the authentication data or does not match an anticipated geometric shape, as described herein.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein is combinable with any element of any other embodiment described herein, unless such features are described as, or by their nature are, mutually exclusive.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Where ranges are described in combination with a set of potential lower or upper values, each value may be used in an open-ended range (e.g., at least 50%, up to 50%), as a single value, or two values may be combined to define a range (e.g., between 50% and 75%).

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improved anti-spoofing in 3D image recognition for biometric authentication, the method comprising:
    collecting a first image from a first position, wherein the first image is generated from a reflection of a first wavelength range of light from an object;
    collecting a second image from a second position, wherein the second is generated from a reflection of a second wavelength range of light from an object;
    identifying a quantity of landmark areas of the first image, the quantity consisting of a lower threshold of 5 and an upper threshold of 15;
    identifying a quantity of matching landmark areas in the second image, each of the matching landmark areas matching a landmark area of the quantity of landmark areas;
    creating a sparse depth map based on stereo vision algorithms comparing each of the landmark areas and matching landmark areas;
    comparing the sparse depth map to one or more geometric templates; and
    determining whether the sparse depth map matches the one or more geometric templates.

2. The method of claim 1, wherein at least one of the first wavelength range and the second wavelength range is an infrared wavelength range.

3. The method of claim 1, further comprising accessing authentication data of a pre-determined item; and
    verifying at least one of the first and the second images against authentication data of the pre-determined item.

4. The method of claim 3, wherein the authentication data includes 3D characteristics; and
    wherein the verifying further comprises comparing the depth of the at least one landmark area to the 3D characteristics of the pre-determined item.

5. The method of claim 3, wherein the authentication data includes 2D characteristics of the pre-determined item; and
    wherein the verifying comprises comparing at least one of the first image and second image to the 2D characteristics of the pre-determined item.

6. The method of claim 1, further comprising
    transforming at least one of the first and the second images with a distortion map.

7. The method of claim 1, further comprising illuminating the object with an artificial light source.

8. The method of claim 1, wherein collecting a second image includes filtering the reflected light with a bandpass filter to collect only the second wavelength range of light.

9. The method of claim 1, wherein the first image and second image are collected at the same time.

10. The method of claim 1, further comprising upsampling the first image to a resolution of the second image.

11. The method of claim 1, wherein the first image and second image are collected with the same imaging sensor; and further comprising moving the imaging sensor from the first position to the second position after collecting the first image and before collecting the second image.

12. A method for improved anti-spoofing in 3D image recognition for biometric authentication, the method comprising:
    collecting a first image of a user face from a first position, wherein the first image is generated from a reflection of a visible wavelength range of light from an object;
    collecting a second image of the user face from a second position, wherein the second is generated from a reflection of an infrared wavelength range of light from an object;
    identifying a quantity of landmark areas of the first image, the quantity consisting of a lower threshold of 5 and an upper threshold of 15;
    identifying a quantity of matching landmark areas in the second image, each of the matching landmark areas matching a landmark area of the quantity of landmark areas;
    creating a sparse depth map based on stereo vision algorithms comparing each of the landmark areas and matching landmark areas;
    comparing the sparse depth map to one or more geometric templates; and
    determining whether the sparse depth map matches the one or more geometric templates.

13. The method of claim 12, further comprising accessing authentication data of a facial information of the user; and
    verifying at least one of the first and the second images against authentication data of the facial information.

14. The method of claim 13, wherein verifying at least one of the first and the second images includes reconstructing 3D information of the user face based on pixel colors of the first image.

15. The method of claim 13, wherein the authentication data includes 3D information.

16. The method of claim 12, wherein the one or more geometric templates includes a cylindrical template.

17. The method of claim 12, wherein the one or more geometric templates is flat.

18. A method for improved anti-spoofing in 3D image recognition for biometric authentication, the method comprising:

collecting a first image of a user face from a first position, wherein the first image is generated from a reflection of a visible wavelength range of light from an object;

collecting a second image of the user face from a second position, wherein the second is generated from a reflection of an infrared wavelength range of light from an object;

identifying a quantity of landmark areas of the first image, the quantity consisting of a lower threshold of 5 and an upper threshold of 15;

identifying a quantity of matching landmark areas in the second image, each of the matching landmark areas matching a landmark area of the quantity of landmark areas;

creating a sparse depth map based on stereo vision algorithms comparing each of the landmark areas and matching landmark areas;

comparing the sparse depth map to one or more geometric templates;

determining whether the sparse depth map matches the one or more geometric templates;

accessing authentication data of a facial information of the user; and if the sparse depth map does not match the one or more geometric templates, verifying at least one of the first and the second images against authentication data of the facial information.

19. The method of claim 18, the facial information including depth information for at least some of the landmark areas.

20. The method of claim 19, the landmark areas including at least a location of a nose of the user face.

* * * * *